(12) United States Patent
Kitada et al.

(10) Patent No.: US 7,096,158 B2
(45) Date of Patent: Aug. 22, 2006

(54) FAILURE PREDICTION NOTIFICATION PRINTER AND PRINTER MANAGEMENT SERVER, FAILURE PREDICTION NOTIFICATION SYSTEM EMPLOYING THEM, FAILURE PREDICTION NOTIFICATION PROGRAM, AND FAILURE PREDICTION NOTIFICATION METHOD

(75) Inventors: Naruhide Kitada, Nagano-ken (JP); Mikio Aoki, Suwa (JP); Toru Takahashi, Matsumoto (JP)

(73) Assignee: Seiko Epson Corporation, (JP)

( * ) Notice: Subject to any disclaimer, the term of this patent is extended or adjusted under 35 U.S.C. 154(b) by 52 days.

(21) Appl. No.: 10/844,971

(22) Filed: May 13, 2004

(65) Prior Publication Data

US 2005/0027486 A1 Feb. 3, 2005

(30) Foreign Application Priority Data

May 14, 2003 (JP) .............................. 2003-136309
Mar. 31, 2004 (JP) .............................. 2004-104983

(51) Int. Cl.
*G06F 3/01* (2006.01)

(52) U.S. Cl. ...................... 702/185; 702/182; 702/183; 702/186

(58) Field of Classification Search .................. 702/81, 702/84, 182–189; 340/435; 701/200; 709/201, 709/223

See application file for complete search history.

(56) References Cited

U.S. PATENT DOCUMENTS

| 5,619,307 A | 4/1997 | Machino et al. ............... 399/11 |
| 5,715,496 A | 2/1998 | Sawada et al. ................. 399/8 |
| 6,397,247 B1 * | 5/2002 | Shirakawa et al. ......... 709/223 |
| 2003/0115591 A1 * | 6/2003 | Weissmueller et al. ....... 725/22 |
| 2004/0220999 A1 * | 11/2004 | Kojima et al. .............. 709/201 |

FOREIGN PATENT DOCUMENTS

| JP | 08-023408 | 1/1996 |
| JP | 2001-216423 | 8/2001 |
| JP | 2002-312027 | 10/2002 |

OTHER PUBLICATIONS

Communication from Chinese Patent Office regarding related application.

* cited by examiner

*Primary Examiner*—Marc S. Hoff
*Assistant Examiner*—Felix Suarez
(74) *Attorney, Agent, or Firm*—Harness, Dickey & Pierce, P.L.C.

(57) ABSTRACT

A method is provided to notify a printer user of a predicted result of a failure without employing dedicated display means. According to the method, information regarding the service situation of a printer P is acquired, the relation between the acquired service situation and a failure is analyzed, the occurrence time, etc. of the failure of the printer P are predicted from the relation, and the result of the prediction is notified to the printer P so as to print the predicted result by employing the print function of the, printer P itself. Thus, the occurrence time, contents, etc. of the failure can be reliably notified to a printer user without employing dedicated display means.

11 Claims, 14 Drawing Sheets

[FIG. 1]
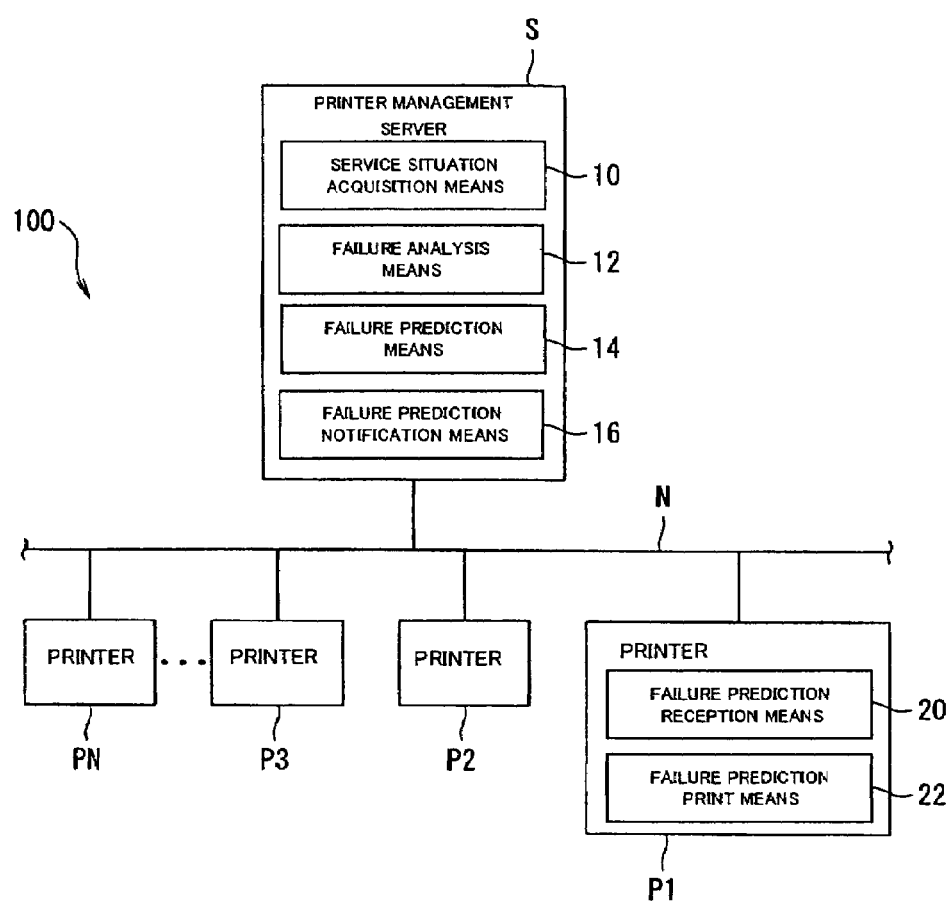

[FIG. 2]
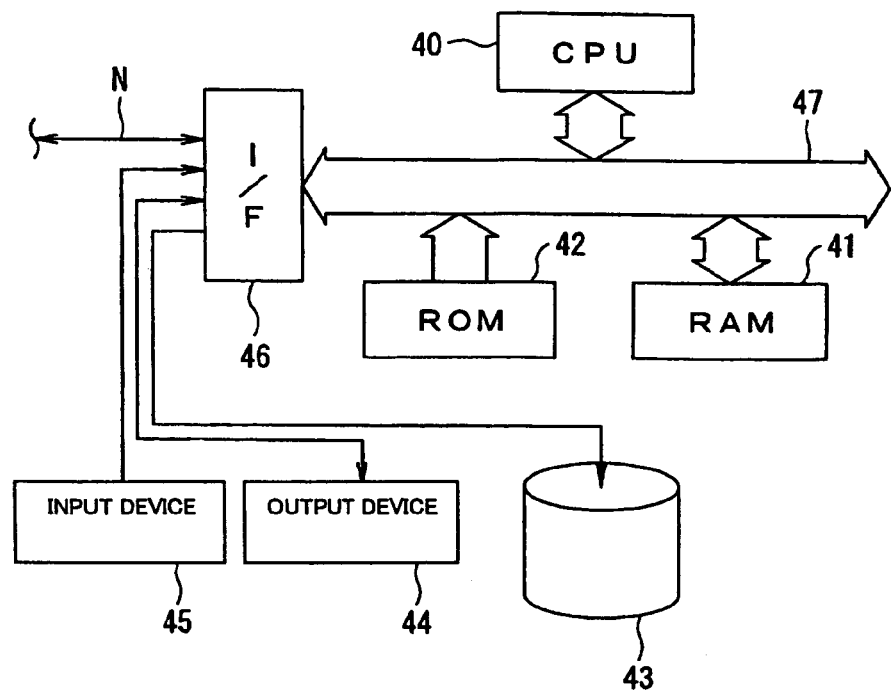

[FIG. 3]
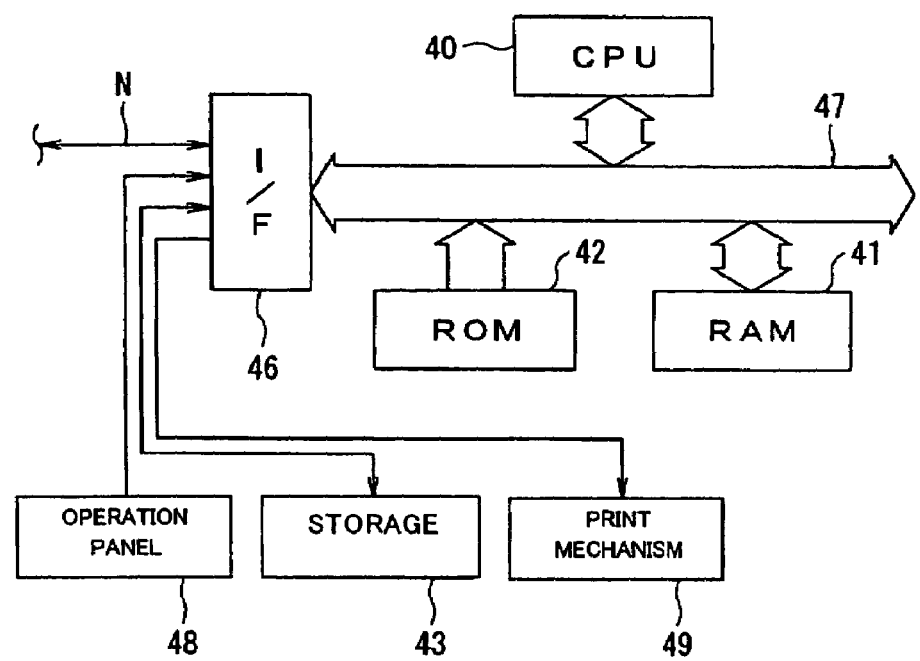

[FIG. 4]
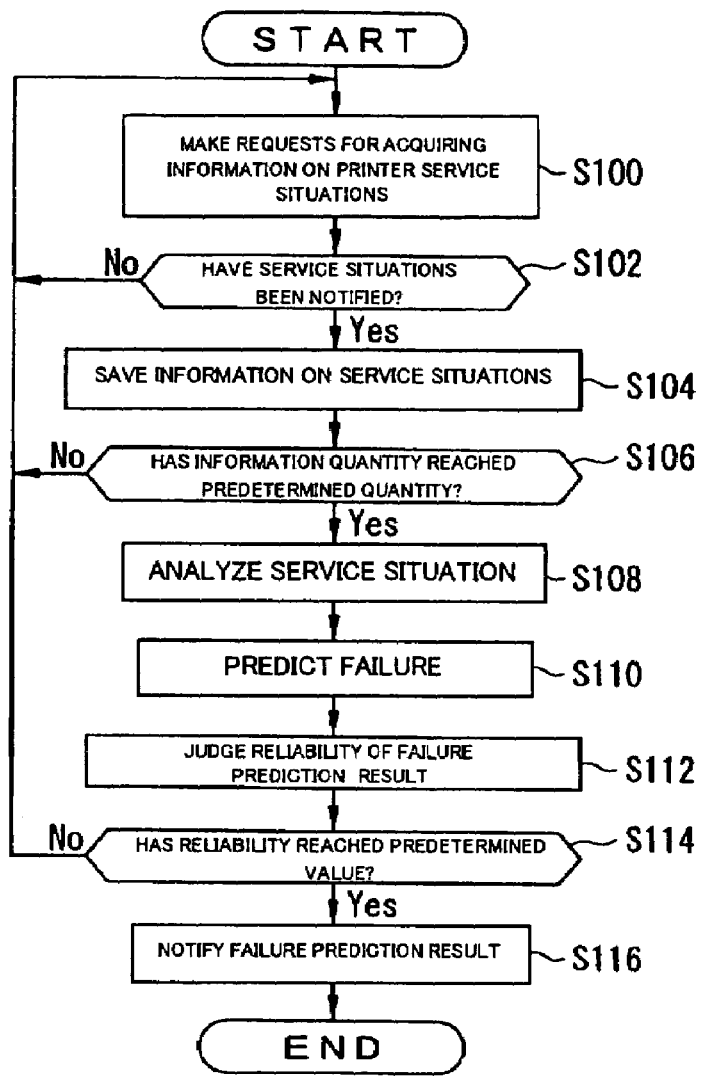

[FIG. 5]
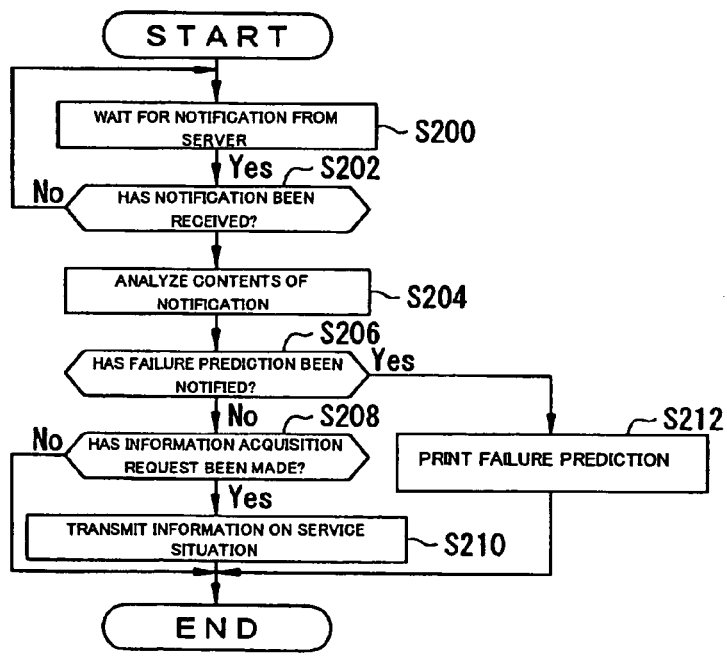

[FIG. 6]

| OPERATION LOG : | OPERATION ID |
|---|---|
| PRINT SPEED : FAST<br>PRINT SHEET : PLAIN PAPER<br>PRINT COLOR : MULTI-COLOR<br>SHEET SIZE : A4<br>NUMBER OF PRINT COPIES : 10 | : 00001 |
| PRINT STATUS LOG :<br>    TOTAL NUMBER OF PRINT COPIES : 2000<br>    PRINTER MODEL : PM-XXX<br>    SERIAL NO. OF PRINTER : 12345<br>    INK RESERVES : C50% M40% Y30% K20%<br>    STATUS : NORMAL<br>    ERROR CODE : ... | |
| OPERATION LOG :<br>PRINT SPEED : FAST<br>PRINT SHEET : PLAIN PAPER<br>PRINT COLOR : MULTI-COLOR<br>SHEET SIZE : A4<br>NUMBER OF PRINT COPIES : 10 | OPERATION ID<br>: 00002 |
| PRINT STATUS LOG :<br>    TOTAL NUMBER OF PRINT COPIES : 2010<br>    PRINTER MODEL : PM-XXX<br>    SERIAL NO. OF PRINTER : 12345<br>    INK RESERVES : C50% M40% Y30% K20%<br>    STATUS : ERROR<br>    ERROR CODE : 1111 | |
| | OPERATION ID |

[FIG. 7]
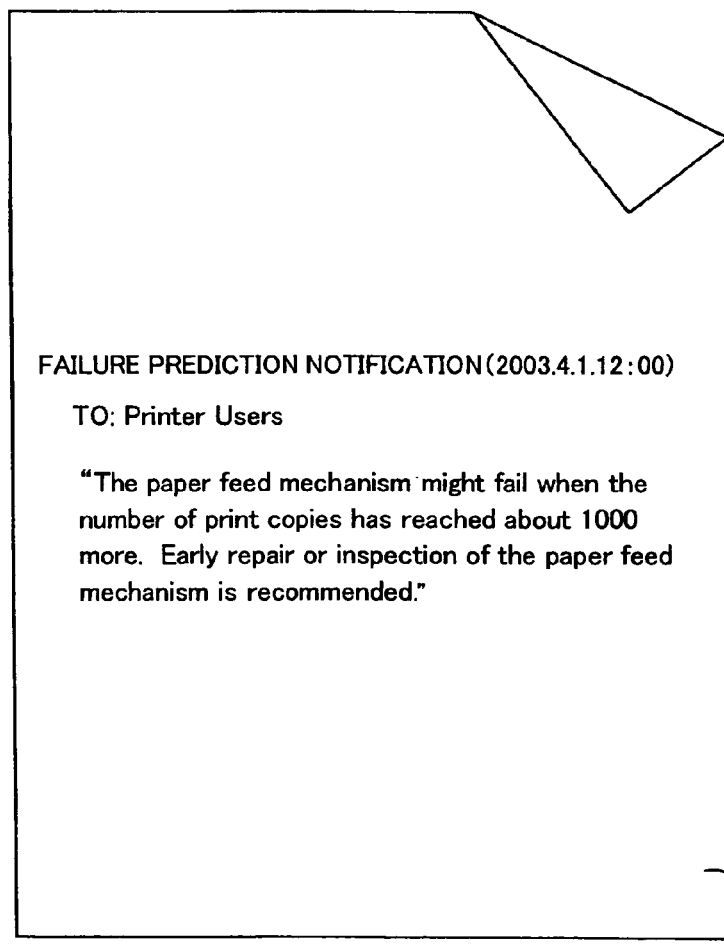

| OPERATION ID | PRINT SPEED | PRINT SHEET | PRINT COLOR | SHEET SIZE | NO. OF PRINT COPIES | TOTAL NO. OF PRINT COPIES | PRINTER MODEL | SERIAL NO. | RESERVE O | RESERVE M | RESERVE Y | RESERVE K | STATUS | ERROR CODE |
|---|---|---|---|---|---|---|---|---|---|---|---|---|---|---|
| 00001 | 1 | 0 | 0 | 0 | 100 | 100 | XXX | 12345 | 90 | 95 | 92 | 92 | 0 | |
| 00002 | 1 | 0 | 0 | 0 | 200 | 300 | XXX | 12345 | 80 | 93 | 82 | 90 | 0 | |
| 00003 | 0 | 0 | 0 | 0 | 1500 | 1500 | XXX | 54321 | 90 | 84 | 92 | 81 | 0 | |
| 00004 | 0 | 0 | 0 | 0 | 1020 | 2520 | XXX | 54321 | 88 | 80 | 90 | 77 | 0 | |
| 00005 | 1 | 0 | 1 | 0 | 10 | 310 | XXX | 12345 | 80 | 92 | 82 | 89 | 0 | |
| 00006 | 1 | 0 | 1 | 0 | 20 | 330 | XXX | 12345 | 80 | 92 | 82 | 89 | 0 | |
| 00007 | 0 | 0 | 0 | 0 | 10 | 2530 | XXX | 54321 | 88 | 79 | 90 | 76 | 0 | |
| 00008 | 1 | 0 | 0 | 0 | 200 | 530 | XXX | 12345 | 73 | 85 | 75 | 82 | 0 | |
| 00009 | 0 | 0 | 0 | 0 | 1300 | 3830 | XXX | 54321 | 83 | 76 | 85 | 73 | 0 | |
| 00010 | 1 | 0 | 0 | 0 | 100 | 630 | XXX | 12345 | 70 | 84 | 72 | 81 | 0 | |
| 00011 | 1 | 0 | 0 | 0 | 300 | 930 | XXX | 12345 | 60 | 80 | 62 | 77 | 0 | |
| 00012 | 0 | 0 | 0 | 0 | 200 | 4030 | XXX | 54321 | 81 | 75 | 83 | 72 | 0 | |
| 00013 | 1 | 0 | 0 | 0 | 60 | 990 | XXX | 12345 | 58 | 80 | 60 | 77 | 0 | |
| 00014 | 1 | 0 | 0 | 0 | 400 | 1390 | XXX | 12345 | 45 | 69 | 47 | 66 | 1 | 11111 |
| 00015 | 0 | 1 | 0 | 0 | 100 | 1490 | XXX | 12345 | 42 | 66 | 44 | 63 | 0 | |
| 00016 | 0 | 0 | 0 | 0 | 20 | 4050 | XXX | 54321 | 81 | 75 | 83 | 72 | 0 | |
| 00017 | 1 | 0 | 1 | 0 | 100 | 4150 | XXX | 54321 | 80 | 74 | 82 | 71 | 0 | |
| 00018 | 1 | 0 | 1 | 0 | 300 | 1790 | XXX | 12345 | 30 | 64 | 32 | 61 | 0 | |
| 00019 | 0 | 0 | 0 | 0 | 300 | 4450 | XXX | 54321 | 75 | 71 | 77 | 68 | 0 | |
| 00020 | 0 | 0 | 1 | 0 | 200 | 4650 | XXX | 54321 | 73 | 70 | 75 | 67 | 0 | |
| 00021 | 0 | 0 | 0 | 0 | 100 | 4750 | XXX | 54321 | 71 | 69 | 73 | 66 | 0 | |
| 00022 | 1 | 0 | 1 | 0 | 100 | 1890 | XXX | 12345 | 28 | 60 | 30 | 57 | 0 | |
| 00023 | 0 | 0 | 0 | 0 | 1900 | 6650 | XXX | 54321 | 70 | 65 | 72 | 62 | 1 | 11111 |
| 00024 | 1 | 0 | 1 | 0 | 150 | 6800 | XXX | 54321 | 69 | 61 | 71 | 58 | 0 | |
| 00025 | 1 | 0 | 0 | 0 | 200 | 2090 | XXX | 12345 | 27 | 62 | 29 | 59 | 1 | 11111 |
| 00026 | 1 | 0 | 1 | 0 | 100 | 2190 | XXX | 12345 | 26 | 61 | 28 | 58 | 0 | |
| 00027 | 1 | 0 | 1 | 0 | 200 | 2390 | XXX | 12345 | 25 | 60 | 27 | 57 | 0 | |

Error C
Error B
Error A

| PRINT SPEED VALUE | NAME |
|---|---|
| 0 | FAIR |
| 1 | FAST |

[FIG. 9b]

| PRINT SHEET VALUE | NAME |
|---|---|
| 0 | PLAIN PAPER |
| 1 | DEDICATED PAPER |

[FIG. 9c]

| PRINT COLOR VALUE | NAME |
|---|---|
| 0 | MULTI-COLOR |
| 1 | MONOCHROME |

[FIG. 9d]

| SHEET SIZE VALUE | NAME |
|---|---|
| 0 | A4 |
| 1 | A3 |

[FIG. 9e]

| STATUS VALUE | NAME |
|---|---|
| 0 | NORMAL |
| 1 | FAILED |

[FIG. 9f]

| ERROR CODE VALUE | NAME |
|---|---|
| 11111 | PAPER FEED FAILURE |
| 22222 | COMMUNICATION FAILURE |

[FIG. 9g]

| ERROR CODE | COUNTERMEASURE |
|---|---|
| 11111 | — |
| 22222 | RE-CONNECT |

[FIG. 10]

| | ERROR INTERVAL (COPIES) OF 11111 | PRINT SETTINGS | MEAN UTILIZATION VALUES |
|---|---|---|---|
| ERROR A { | 1390 | PRINT SPEED | 1.000 |
| | 1390 | PRINT SHEET | 0.000 |
| | 1390 | PRINT COLOR | 0.222 |
| | 1390 | SHEET SIZE | 0.000 |
| ERROR B { | 800 | PRINT SPEED | 1.000 |
| | 800 | PRINT SHEET | 0.000 |
| | 800 | PRINT COLOR | 0.800 |
| | 800 | SHEET SIZE | 0.000 |
| ERROR C { | 6800 | PRINT SPEED | 0.083 |
| | 6800 | PRINT COLOR | 0.167 |
| | 6800 | PRINT SHEET | 0.000 |
| | 6800 | SHEET SIZE | 0.000 |

117 = ERROR INTERVAL (COPIES) OF 11111; 115 = PRINT SETTINGS; 116 = MEAN UTILIZATION VALUES

[FIG. 11]

| PRINT SPEED | -0.996 | → INTENSE CORRELATION |
|---|---|---|
| PRINT COLOR | -0.63824 | → INTENSE CORRELATION |
| PRINT SHEET | NO CORRELATION (IMMEASURABLE) | |
| SHEET SIZE | NO CORRELATION (IMMEASURABLE) | |

[FIG. 12]

| ITEMS OF NOTIFICATION | CONTENTS OF NOTIFICATION |
|---|---|
| PREDICTION FAILURE TIME PERIOD | 395,772 COPIES |
| PREDICTION FAILURE CODE | 11111 |
| ANNEXED MESSAGE | RECOMMENDATIONS: FAIR, MULTI-COLOR |

[FIG. 13]

| PREDICTION FAILURE CODE | FORMAT | NECESSARY INFORMATION |
|---|---|---|
| 11111 | \<CAPITAL\>FAILURE PREDICTION NOTIFICATION($DATE,$HOUR)\</CAPITAL\><br>　　\<CAPITAL\>$USER_NAME\</CAPITAL\><br>　　"PAPER FEED MECHANISM MIGHT FAIL WHEN PRINT CONTENTS HAVE REACHED ABOUT $REST MORE. | $DATE, $HOUR, $USER_NAME, $REST |
| 22222 | \<CAPITAL\>POSSIBILITY OF OCCURRENCE OF COMMUNICATION TROUBLE\</CAPITAL\>.<br>$ATTACHE | $ATTACHE |

[FIG. 14]
| NAME OF VARIABLE | VALUE |
|---|---|
| $DATE | 2003.4.1 |
| $HOUR | 12:00 |
| $USER_NAME | PRINTER USER |
| $ERROR_CODE | 11111 |
| $REST | 395.772 |
| $ATTACHE | RECOMMENDATIONS: FAIR, MULTI-COLOR |
[FIG. 15]
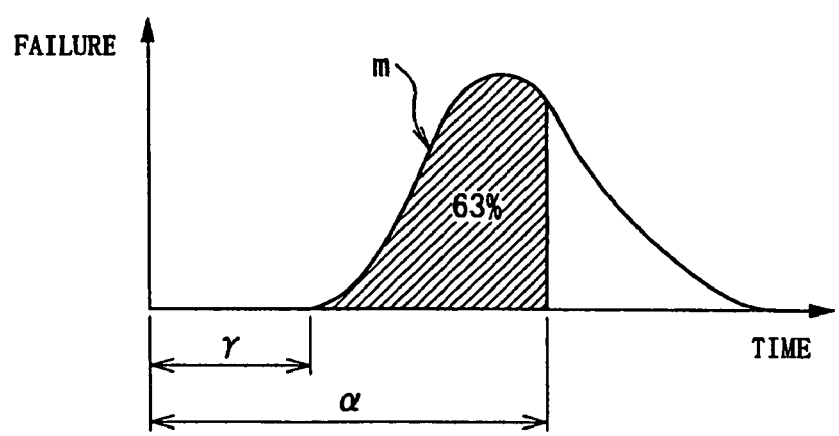

[FIG. 16]
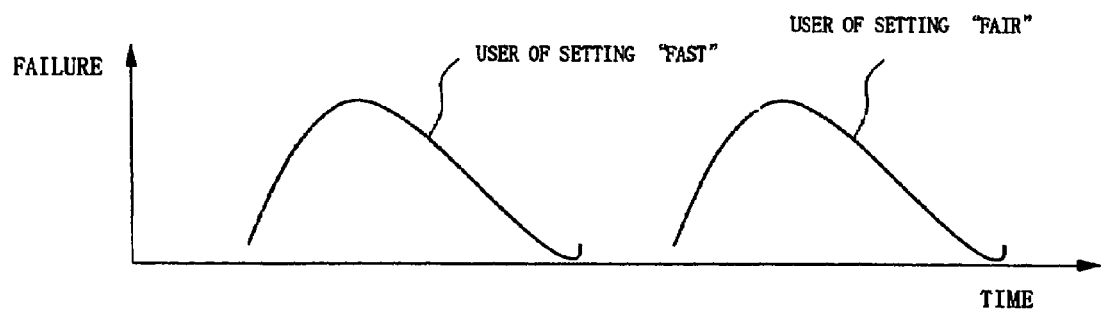

FAILURE PREDICTION NOTIFICATION PRINTER AND PRINTER MANAGEMENT SERVER, FAILURE PREDICTION NOTIFICATION SYSTEM EMPLOYING THEM, FAILURE PREDICTION NOTIFICATION PROGRAM, AND FAILURE PREDICTION NOTIFICATION METHOD

RELATED APPLICATIONS

This application claims priority to Japanese Patent Application No. 2003-136309 filed May 14, 2003 and 2004-104983 filed Mar. 31, 2004 which are hereby expressly incorporated by reference herein in their entirety.

BACKGROUND

1. Technical Field

The present invention relates to a failure prediction notification printer and a printer management server, a failure prediction notification system employing them, a failure prediction notification program and a failure prediction notification method in which a failure occurrence time is concretely predicted from the service situations of individual printers connected to a network, so as to notify the prediction to users.

2. Background Art

In general, equipment for business use, such as printers, copying machines and facsimiles, often exert serious influence on business due to the occurrence of unexpected failures or troubles.

Therefore, many manufacturers which provide the equipment repeat various tests and improvements and endeavor to thoroughly exclude the causes of the failures and troubles before sales.

In actuality, however, the elimination of the failures and troubles is extremely difficult in relation to unforeseen uses, the years of endurances of the equipment themselves, etc.

It is accordingly reasonable to handle such equipment on the assumption that the failures and troubles will inevitably occur in the future. A recent theme has shifted to how the time at which a failure is considered to actually occur, and the contents of the failure are precisely predicted by immediately acquiring the information of the failures and troubles and making the factors of the occurrences clear.

In, for example, JP-A-8-23408, JP-A-2001-216423, and JP-A-2002-312027, there has been proposed a method wherein a printer and a server are connected by a network, printer information items such as the number of print copies and a turn-ON time period are acquired from the printer through the network, and a high degree of processing is executed on the basis of the acquired printer information by the computer or the like of the server, thereby to perform the precise failure prediction.

Meanwhile, in such a method hitherto proposed, in order to notify a user of a failure prediction result obtained by the computer or the like, the printer needs to include dedicated display means such as an LCD display.

Therefore, the method cannot be applied to a conventional printer which does not include such dedicated display means. For sharing in the benefit of the method, it is necessary to prepare the dedicated display means or to purchase anew the printer including the display means, resulting in the drawback that the cost of introduction becomes high.

Accordingly, the present invention has been made in order to effectively solve such a problem, and an object is to provide a novel failure prediction notification printer and printer management server, failure prediction notification system employing them, failure prediction notification program and failure prediction notification method according to which the occurrence time, contents, etc. of a failure can be reliably notified to printer users, and others without employing dedicated display means such as an LCD display.

SUMMARY

The printer of Aspect 1 for solving the problem is characterized by comprising failure prediction reception means for receiving failure prediction information regarding a failure time and failure prediction contents as notified from failure prediction notification means; and failure prediction print means for printing the failure prediction information received by the failure prediction reception means on a print medium and outputting the printed information by employing a print function of the printer itself.

Due to such a construction, the printer receives the failure prediction information regarding the failure time and the failure contents as notified from the failure prediction notification means included in a printer management server, another personal computer or the like, and it prints the received information on the print medium (print sheet) and outputs the printed information by employing its own print function which is a basic function indispensable to a printing device.

Thus, detailed information such as the occurrence time of a failure and the concrete contents thereof can be reliably notified to printer users, and others through a printed matter without employing dedicated display means for displaying a failure prediction notification.

As a result, the printer users, and others can roughly grasp the time of the occurrence of the failure and are permitted to form a plan for requesting maintenance or repair, at an appropriate time beforehand, so that the negative influence, etc. of the unexpected failure on business can be avoided before they happen.

Moreover, the advantage can be attained without preparing anew the dedicated display means such as an LCD display or buying anew a printer furnished with the display means, so that superior economy can be demonstrated.

The printer of Aspect 2 is characterized by comprising failure prediction reception means for receiving failure prediction information regarding a failure time and failure contents as notified from a printer management server; and failure prediction print means for printing the failure prediction information received by the failure prediction reception means on a print medium and outputting the printed information by employing a print function of the printer itself.

Due to such a construction, the printer receives the failure prediction information regarding the failure time and the failure contents as notified from the printer management server, and it can print the received information on the print medium and output the printed information by employing its own print function, so that detailed information such as the occurrence time and contents of a failure can be reliably notified to printer users, and others without employing dedicated display means, just as in Aspect 1.

The printer management server of Aspect 3 is characterized by comprising service situation acquisition means for acquiring information regarding a service situation of a printer; failure analysis means for analyzing a relation between the information regarding the service situation as acquired by the service situation acquisition means and a failure of the printer; failure prediction means for predicting an occurrence time of the failure of the printer and contents of the failure from the relation analyzed by the failure analysis means; and failure prediction notification means for notifying the occurrence time of the failure of the printer and the contents of the failure as predicted by the failure prediction means.

Thus, the printer management server can obtain an appropriate failure prediction result and notify the result to the printer, so that the printer which receives the notification of the failure prediction from the printer management server can reliably notify printer users, and others of detailed information such as the occurrence time and contents of the failure, without employing dedicated display means, just as in Aspect 1.

The printer management server of Aspect 4 comprises the printer management server as defined in Aspect 3, characterized in that the failure prediction notification means simultaneously notifies a method of avoiding the failure.

Thus, the printer users, and others can be simultaneously notified of the method of avoiding the failure and a countermeasure in the case of the actual occurrence of the failure, so that they are permitted to avoid the occurrence of the future failure predicted in case of using the printer left intact, or to perform free print scheduling such as delaying the occurrence of the failure more.

The printer management server of Aspect 5 comprises the printer management server as defined in Aspect 3, characterized in that the failure prediction notification means notifies the predictive result predicted by the failure prediction means, when a reliability of the predictive result has reached a predetermined value.

Thus, only the predictive results of high reliability (for example, at least 80%) can be notified to the printer users, and others, so that the predictive results of low reliability can be prevented from being vainly notified.

The failure prediction notification system of Aspect 6 comprises a failure prediction notification system wherein a printer and failure prediction notification means are connected in telecommunicable fashion, characterized in that the printer comprises failure prediction reception means for receiving failure prediction information regarding a failure time and failure prediction contents as notified from the failure prediction notification means; and failure prediction print means for printing the failure prediction information received by the failure prediction reception means on a print medium and outputting the printed information by employing a print function of the printer itself.

Due to such a construction, just as in Aspect 1, the printer receives the failure prediction information regarding the failure time and the failure contents as notified from the failure prediction notification means included in a printer management server, another personal computer or the like, and it prints the received information on the print medium and outputs the printed information by employing its own print function which is a basic function indispensable to a printing device.

Thus, detailed information such as the occurrence time of a failure and the concrete contents thereof can be reliably notified to printer users, and others through a printed matter without employing dedicated display means such as an LCD display.

As a result, the printer users, and others can make a request for maintenance or repair at an appropriate time, so that the negative influence, etc. of the unexpected failure on business can be avoided before they happen.

Moreover, the advantage can be attained without preparing the dedicated display means or buying a printer furnished with the display means, so that superior economy can be demonstrated.

The failure prediction notification system of Aspect 7 comprises a system wherein a printer and a printer management server are connected in telecommunicable fashion, characterized in that the printer comprises failure prediction reception means for receiving failure prediction information regarding a failure time and failure contents as notified from the printer management server; and failure prediction print means for printing the failure prediction information received by the failure prediction reception means on a print medium and outputting the printed information by employing a print function of the printer itself.

Due to such a construction, just as in Aspect 2, the printer receives the failure prediction information regarding the failure time and the failure contents as notified from the printer management server, and it can print the received information on the print medium and output the printed information by employing its own print function.

As a result, just as in Aspect 1, detailed information such as the occurrence time and contents of a failure can be reliably notified to printer users, and others without employing dedicated display means.

The failure prediction notification system of Aspect 8 comprises a system wherein a printer, and a printer management server which manages the printer are connected in telecommunicable fashion, characterized in: that the printer management server comprises service situation acquisition means for acquiring information regarding a service situation of the printer, failure analysis means for analyzing a relation between the information regarding the service situation as acquired by the service situation acquisition means and a failure of the printer, failure prediction means for predicting an occurrence time of the failure of the printer and contents of the failure from the relation analyzed by the failure analysis means, and failure prediction notification means for notifying the occurrence time of the failure of the printer and the contents of the failure as predicted by the failure prediction means, to the printer through the network; and that the printer comprises failure prediction reception means for receiving failure prediction information regarding a failure time and failure prediction contents as notified from the failure prediction notification means, and failure prediction print means for printing the failure prediction information received by the failure prediction reception means on a print medium and outputting the printed information by employing a print function of the printer itself.

Thus, the printer management server can perform an appropriate failure prediction on the basis of the information regarding the service situation of the printer, and notify the result of the prediction to the printer.

Accordingly, the printer which receives the notification of the failure prediction from the printer management server can reliably notify detailed information such as the occurrence time and contents of a failure, to printer users, and others without employing dedicated display means, just as in Aspect 1.

The failure prediction notification system of Aspect 9 comprises the failure prediction notification system as defined in any of Inventions 6–8, characterized in that the failure prediction notification means simultaneously notifies a method of avoiding the failure.

Thus, just as in Aspect 4, the printer users, and others can be simultaneously notified of the method of avoiding the failure and a countermeasure in the case of the actual occurrence of the failure, so that they are permitted to avoid the occurrence of the future failure predicted in case of using the printer left intact, or to perform free print scheduling such as delaying the occurrence of the failure more.

The failure prediction notification system of Aspect 10 comprises the failure prediction notification system as defined in any of Inventions 6–8, characterized in that the failure prediction notification means notifies the predictive information predicted by the failure prediction means, when a reliability of the predictive information has reached a predetermined value.

Thus, just as in Aspect 5, only the predictive results of high reliability (for example, at least 80%) can be notified to the printer users, and others, so that the predictive results of low reliability can be prevented from being vainly notified.

The failure prediction notification program of Aspect 11 comprises a failure prediction notification program for use in a printer which is connected with failure prediction notification means in telecommunicable fashion, characterized by causing a computer to function as failure prediction reception means for receiving failure prediction information regarding a failure time and failure prediction contents as notified from the failure prediction notification means; and failure prediction print means for printing the failure prediction information received by the failure prediction reception means on a print medium and outputting the printed information by employing a print function of the printer itself.

Due to such a construction, just as in Aspect 1, the printer receives the failure prediction information regarding the failure time and the failure contents as notified from the failure prediction notification means included in a printer management server, another personal computer or the like, and it prints the received information on the print medium and outputs the printed information by employing its own print function which is a basic function indispensable to a printing device.

Thus, detailed information such as the occurrence time of a failure and the concrete contents thereof can be reliably notified to printer users, and others through a printed matter without employing dedicated display means such as an LCD display.

As a result, the printer users, and others can make a request for maintenance or repair at an appropriate time, so that the negative influence, etc. of the unexpected failure on business can be avoided before they happen.

Moreover, the advantage can be attained without preparing the dedicated display means or buying a printer furnished with the display means, so that superior economy can be demonstrated.

Besides, the respective means may be realized by employing a computer system which is installed in each of many existing printers, so that they can be realized less expensively and more easily than in a case where they are realized by preparing dedicated hardware or fabricating them anew.

Further, version upgrades such as the modifications or alterations of the respective means can be readily made simply by rewriting parts of the program.

The failure prediction notification program of Aspect 12 comprises a failure prediction notification program for use in a printer which is connected with a printer management server in telecommunicable fashion, characterized by causing a computer to function as failure prediction reception means for receiving failure prediction information regarding a failure time and failure contents as notified from the printer management server; and failure prediction print means for printing the failure prediction information received by the failure prediction reception means on a print medium and outputting the printed information by employing a print function of the printer itself.

Due to such a construction, just as in Aspect 2, the printer receives the failure prediction information regarding the failure time and the failure contents as notified from the printer management server, and it can print the received information on the print medium and output the printed information by employing its own print function.

As a result, just as in Aspect 1, detailed information such as the occurrence time and contents of a failure can be reliably notified to printer users, and others without employing dedicated display means.

Besides, just as in Aspect 11, the respective means may be realized by employing a computer system which is installed in each of many existing printers, so that they can be realized less expensively and more easily than in a case where they are realized by preparing dedicated hardware or fabricating them anew.

Further, version upgrades such as the modifications or alterations of the respective means can be readily made simply by rewriting parts of the program.

The failure prediction notification program of Aspect 13 comprises a failure prediction notification program for use in a system in which a printer, and a printer management server for managing the printer are connected in telecommunicable fashion, characterized by causing a computer of the printer management server to function as service situation acquisition means for acquiring information regarding a service situation of the printer, failure analysis means for analyzing a relation between the information regarding the service situation as acquired by the service situation acquisition means and a failure of the printer, failure prediction means for predicting an occurrence time of the failure of the printer and contents of the failure from the relation analyzed by the failure analysis means, and failure prediction notification means for notifying the occurrence time of the failure of the printer and the contents of the failure as predicted by the failure prediction means, to the printer through the network; and by causing a computer of the printer to function as failure prediction reception means for receiving failure prediction information regarding a failure time and failure prediction contents as notified from the failure prediction notification means, and failure prediction print means for printing the failure prediction information received by the failure prediction reception means on a print medium and outputting the printed information by employing a print function of the printer itself.

Thus, just as in Aspect 8, the printer management server can perform an appropriate failure prediction on the basis of the information regarding the service situation of the printer, and notify the result of the prediction to the printer.

Accordingly, the printer which receives the notification of the failure prediction from the printer management server can reliably notify detailed information such as the occurrence time and contents of a failure, to printer users, and others without employing dedicated display means, just as in Aspect 1.

Besides, just as in Aspect 11, the respective means may be realized by employing a computer system which is installed in each of many existing printers, so that they can be realized less expensively and more easily than in a case where they are realized by preparing dedicated hardware or fabricating them anew.

Further, version upgrades such as the modifications or alterations of the respective means can be readily made simply by rewriting parts of the program.

The failure prediction notification program of Aspect 14 comprises the failure prediction notification program as defined in any of Inventions 11–13, characterized in that the failure prediction notification means simultaneously notifies a method of avoiding the failure.

Thus, just as in Aspect 4, the printer users, and others can be simultaneously notified of the method of avoiding the failure and a countermeasure in the case of the actual occurrence of the failure, so that they are permitted to avoid the occurrence of the future failure predicted in case of using the printer left intact, or to perform free print scheduling such as delaying the occurrence of the failure more.

Moreover, just as in Aspect 11, the failure prediction notification means may be realized by employing a computer system which is installed in each of many existing printers, so that it can be realized less expensively and more easily than in a case where it is realized by preparing dedicated hardware or fabricating it anew.

Further, version upgrades such as the modification or alteration of the failure notification means can be readily made simply by rewriting part of the program.

The failure prediction notification program of Aspect 15 comprises the failure prediction notification program as defined in any of Inventions 11–13, characterized in that the failure prediction notification means notifies the result of the prediction predicted by the failure prediction means, when a reliability of the predictive result has reached a predetermined value.

Thus, just as in Aspect 5, only the predictive results of high reliability (for example, at least 80%) can be notified to the printer users, and others, so that the predictive results of low reliability can be prevented from being vainly notified.

Moreover, just as in Aspect 11, the failure prediction notification means may be realized by employing a computer system which is installed in each of many existing printers, so that it can be realized less expensively and more easily than in a case where it is realized by preparing dedicated hardware or fabricating it anew.

Further, version upgrades such as the modification or alteration of the failure notification means can be readily made simply by rewriting part of the program.

The failure prediction notification method of Aspect 16 comprises a failure prediction notification method for use in a printer which is connected with failure prediction notification means in telecommunicable fashion, characterized by comprising the failure prediction reception step of receiving failure prediction information regarding a failure time and failure prediction contents as notified from the failure prediction notification means; and the failure prediction print step of printing the failure prediction information received at the failure prediction reception step, on a print medium and outputting the printed information by employing a print function of the printer itself.

Due to such a construction, just as in Aspect 1, the printer receives the failure prediction information regarding the failure time and the failure contents as notified from the failure prediction notification means included in a printer management server, another personal computer or the like, and it prints the received information on the print medium and outputs the printed information by employing its own print function which is a basic function indispensable to a printing device.

Thus, detailed information such as the occurrence time of a failure and the concrete contents thereof can be reliably notified to printer users, and others through a printed matter without employing dedicated display means such as an LCD display.

As a result, the printer users, and others can make a request for maintenance or repair at an appropriate time, so that the negative influence, etc. of the unexpected failure on business can be avoided before they happen.

Moreover, the advantage can be attained without preparing the dedicated display means or buying a printer furnished with the display means, so that superior economy can be demonstrated.

The failure prediction notification method of Aspect 17 comprises a failure prediction notification method for use in a printer which is connected with a printer management server in telecommunicable fashion, characterized by comprising the failure prediction reception step of receiving failure prediction information regarding a failure time and failure prediction contents as notified from the printer management server; and the failure prediction print step of printing the failure prediction information received at the failure prediction reception step, on a print medium and outputting the printed information by employing a print function of the printer itself.

Due to such a construction, just as in Aspect 2, the printer receives the failure prediction information regarding the failure time and the failure contents as notified from the printer management server, and it can print the received information on the print medium and output the printed information by employing its own print function.

As a result, just as in Aspect 1, detailed information such as the occurrence time and contents of a failure can be reliably notified to printer users, and others without employing dedicated display means.

The failure prediction notification method of Aspect 18 comprises a method which prints and outputs failure prediction information by employing a print function of a printer, characterized by comprising the service situation acquisition step of acquiring information regarding a service situation of the printer; the failure analysis step of analyzing a relation between the information regarding the service situation as acquired at the service situation acquisition step and a failure of the printer; the failure prediction step of predicting an occurrence time of the failure of the printer and contents of the failure from the relation analyzed at the failure analysis step; the failure prediction notification step of notifying the printer of the occurrence time of the failure of the printer and the contents of the failure as predicted at the failure prediction step; the failure prediction reception step of receiving the failure prediction information regarding the failure time and the failure contents as notified at the failure prediction notification step; and the failure prediction print step of printing the failure prediction information received at the failure prediction reception step, on a print medium and outputting the printed information by employing the print function of the printer.

Thus, the printer management server can create appropriate failure prediction information on the basis of the information regarding the service situation of the printer, and notify the result of the prediction to the printer.

Accordingly, the printer which receives the notification of the failure prediction from the printer management server can reliably notify detailed information such as the occurrence time and contents of a failure, to printer users, and others without employing dedicated display means, just as in Aspect 1.

The failure prediction notification method of Aspect 19 comprises the failure prediction notification method as defined in any of Inventions 16–18, characterized in that the failure prediction notification step simultaneously notifies a method of avoiding the failure.

Thus, just as in Aspect 4, the printer users, and others can be simultaneously notified of the method of avoiding the failure and a countermeasure in the case of the actual occurrence of the failure, so that they are permitted to avoid the occurrence of the future failure predicted in case of using the printer left intact, or to perform free print scheduling such as delaying the occurrence of the failure more.

The failure prediction notification method of Aspect 20 comprises the failure prediction notification method as defined in any of Inventions 16–18, characterized in that the failure prediction notification step notifies the predictive result predicted at the failure prediction step, when a reliability of the predictive step has reached a predetermined value.

Thus, just as in Aspect 5, only the predictive results of high reliability (for example, at least 80%) can be notified to the printer users, and others, so that the predictive results of low reliability can be prevented from being vainly notified.

The failure prediction notification method of Aspect 21 comprises a failure prediction notification method for use in a printer which is connected with failure prediction notification means in telecommunicable fashion, characterized by comprising the failure prediction information reception step of allowing the printer to receive failure prediction information regarding a failure time and failure prediction contents as notified from the failure prediction notification means; and the failure prediction information print step of allowing the printer to print the failure prediction information on a print medium and to output the printed information.

Due to such a construction, just as in Aspect 1, the printer receives the failure prediction information regarding the failure time and the failure contents as notified from the failure prediction notification means included in a printer management server, another personal computer or the like, and it prints the received information on the print medium and outputs the printed information by employing its own print means which affords a basic function indispensable to a printing device.

Thus, detailed information such as the occurrence time of a failure and the concrete contents thereof can be reliably notified to printer users, and others through a printed matter without employing dedicated display means such as an LCD display.

As a result, the printer users, and others can make a request for maintenance or repair at an appropriate time, so that the negative influence, etc. of the unexpected failure on business can be avoided before they happen.

Moreover, the advantage can be attained without preparing the dedicated display means or buying a printer furnished with the display means, so that superior economy can be demonstrated.

The failure prediction notification method of Aspect 22 comprises a failure prediction notification method for use in a printer which is connected with a printer management server in telecommunicable fashion, characterized by comprising the failure prediction information reception step of allowing the printer to receive failure prediction information regarding a failure time and failure prediction contents as notified from the printer management server; and the failure prediction information print step of allowing the printer to print the failure prediction information on a print medium and to output the printed information.

Due to such a construction, just as in Aspect 2, the printer receives the failure prediction information regarding the failure time and the failure contents as notified from the printer management server, and it can print the received information on the print medium and output the printed information by employing its own print means.

As a result, just as in Aspect 1, detailed information such as the occurrence time and contents of a failure can be reliably notified to printer users, and others without employing dedicated display means.

The failure prediction notification method of Aspect 23 is characterized by comprising the service situation information acquisition step of allowing a printer management server to acquire information regarding a service situation of a printer; the failure analysis step of allowing the printer management server to analyze a relation between the information regarding the service situation and a failure of the printer; the failure prediction step of allowing the printer management server to predict an occurrence time of the failure of the printer and contents of the failure from the analyzed relation; the failure prediction notification step of allowing the printer management server to notify the printer of failure prediction information regarding the occurrence time of the failure of the printer and the contents of the failure; the failure prediction reception step of allowing the printer to receive the failure prediction information; and the failure prediction print step of allowing the printer to print the failure prediction information on a print medium and to output the printed information.

Thus, the printer management server can create appropriate failure prediction information on the basis of the information regarding the service situation of the printer, and notify the result of the prediction to the printer.

Accordingly, the printer which receives the notification of the failure prediction from the printer management server can reliably notify detailed information such as the occurrence time and contents of a failure, to printer users, and others without employing dedicated display means, just as in Aspect 1.

To solve the problem stated before, the failure prediction notification system of Aspect 24 is characterized by comprising service situation acquisition means for periodically or occasionally acquiring and saving information regarding service situations of a plurality of printers which are connected so as to be telecommunicable with each other by a network, failure analysis means for analyzing a correlation between a failure and the service situations acquired and saved by the service situation acquisition means, failure prediction means for predicting an occurrence time of the failure and contents of the failure for each of the printers from the correlation analyzed by the failure analysis means, failure notification means for notifying the failure occurrence time and the failure contents for each printer as predicted by the failure prediction means, to each printer through the network, and prediction result print means for notifying the failure time and contents notified by the failure notification means, as a printed matter to printer users by utilizing a print function of each printer.

That is, according to the present invention, the failure analysis means analyzes the correlation between the service situations and the failure, on the basis of the information regarding the service situations of the individual printers acquired and saved by the service situation acquisition means, and the failure prediction means predicts the occurrence time of the failure and the contents thereof for each of the printers, from the analyzed correlation.

Besides, when the predicted failure occurrence time and failure contents for each of the printers are notified to each printer by utilizing the communication function of the failure notification means, the prediction result print means prints the notified failure time and contents and notifies as the printed matter to the printer users by utilizing the print function of each printer as it is.

Thus, complicated information such as the occurrence time of the failure and the concrete contents thereof can be reliably notified to the printer users without employing dedicated display means such as an LCD display.

Accordingly, even when the dedicated display means is not prepared or a printer furnished with the display means is bought, the information can be notified to the users by utilizing the print function inherent in the printer, so that the invention is directly applicable even to a conventional printer which is not furnished with the dedicated display means.

The failure prediction notification system of Aspect 25 comprises the failure prediction notification system as defined in Aspect 24, characterized in that the failure prediction notification means simultaneously notifies a method of use for avoiding the failure.

Thus, the users of the individual printers can be notified of, not only the occurrence time and contents of the failure, but also the method of avoiding the failure, so that they are permitted to form appropriate print scheduling, that is, to take a countermeasure such as avoiding the occurrence of the predicted failure or delaying the occurrence of the failure more.

The failure prediction notification system of Aspect 26 comprises the failure prediction notification system as defined in Aspect 24 or 25, characterized in that a printer management server is connected to the network, and that either of the respective means is included in the printer management server.

Thus, complicated processing, such as the analysis of the correlation between the service situations and the failure or the prediction of the failure time and contents, can be entrusted to the printer management server, so that an information processing burden by the printer is lightened. Moreover, in general, the printer management server is often furnished with a computer system of high performance, so that a time period required for the information processing can be greatly shortened.

The failure prediction notification program of Aspect 27 is characterized by causing a computer to function as service situation acquisition means for periodically or occasionally acquiring and saving information regarding service situations of a plurality of printers which are connected so as to be telecommunicable with each other by a network, failure analysis means for analyzing a correlation between a failure and the service situations acquired and saved by the service situation acquisition means, failure prediction means for predicting an occurrence time of the failure and contents of the failure for each of the printers from the correlation analyzed by the failure analysis means, failure notification means for notifying the failure occurrence time and the failure contents for each printer as predicted by the failure prediction means, to each printer through the network, and prediction result print means for notifying the failure time and contents notified by the failure notification means, as a printed matter to printer users by utilizing a print function of each printer.

Thus, the same advantages as those of Aspect 24 are attained, and the respective functions may be realized by employing a general-purpose personal computer which is available inexpensively, so that the respective functions can be realized less expensively and more easily than in a case where they are realized by preparing dedicated hardware or fabricating them anew.

The failure prediction notification program of Aspect 28 comprises the failure prediction notification program as defined in Aspect 27, characterized in that the computer is a computer of each of the printers.

Thus, the same advantages as those of Aspect 24 are attained, and the need to separately prepare a new computer system is dispensed with, so that the respective functions can be realized more inexpensively and easily.

The failure prediction notification program of Aspect 29 comprises the failure prediction notification program as defined in Aspect 27, characterized in that the computer is a computer of a printer management server which is connected to the network.

Thus, just as in Aspect 26, complicated processing can be entrusted to the printer management server which generally includes a computer system of high performance, so that the burden of information processing to the printer is lightened, and a processing time period required for the complicated processing can be greatly shortened.

Moreover, just as in Aspect 28, the need to separately prepare a new computer system is dispensed with, so that the respective functions can be realized more inexpensively and easily.

A failure prediction notification method as defined in Aspect 30 is characterized by connecting a plurality of printers so as to be telecommunicable with each other by a network, periodically or occasionally acquiring information regarding service situations of the individual printers, periodically or occasionally analyzing a correlation between a failure and the acquired service situations of the respective printers, thereafter predicting an occurrence time of the failure and contents of the failure for each of the printers from the analyzed correlation, notifying the predicted failure occurrence time and failure contents for each printer, to each printer through the network, and printing the failure time and contents by employing a print function of each printer, so as to concretely notify them to users.

Thus, just as in Aspect 24, the occurrence time and contents of the failure, etc. can be reliably notified to the printer users without employing dedicated display means, and the rise of the manufacturing cost of a printer attributable to the installation of the dedicated display means is avoided.

Moreover, the information is notified to the users by utilizing the print function inherent in the printer, so that the invention is directly applicable even to a conventional printer which is not furnished with the dedicated display means.

Further, in case of notifying the information by mail or like means, some of the recipients of the mail are not directly relevant to the printing, but the printing can directly convey the information to the users relevant to the printers.

A failure prediction notification method as defined in Aspect 31 is characterized by connecting a plurality of printers so as to be telecommunicable with each other by a network, periodically or occasionally acquiring information regarding service situations of the individual printers, periodically or occasionally analyzing a correlation between a failure and the acquired service situations of the respective printers, thereafter predicting an occurrence time of the failure and contents of the failure for each of the printers from the analyzed correlation, so as to simultaneously analyze the method of use for avoiding the failure and a countermeasure in the case of the actual occurrence of the failure, notifying the predicted failure occurrence time and failure contents for each printer, the method of use for avoiding the failure and the countermeasure in the case of the actual occurrence of the failure, to each printer through the network, and printing the failure time and contents, the method of use for avoiding the failure and the countermeasure in the case of the actual occurrence of the failure, by employing a print function of each printer, so as to concretely notify them to printer users.

That is, just as in Aspect 25, the invention comprises notifying the method of use for avoiding the failure and the countermeasure in the case of the actual occurrence of the failure, together with the occurrence time and contents of the failure.

Thus, the users of the respective printers can be also notified of the method of use for avoiding the failure and the countermeasure in the case of the actual occurrence of the failure, so that they are permitted to form free print scheduling such as avoiding the occurrence of the predicted failure or delaying the occurrence of the failure more.

The failure prediction notification method of Aspect 32 comprises the failure prediction notification method as defined in Aspect 30 or 31, characterized in that a printer management server is connected to the network, and that the printer management server is caused to function as either of the respective means.

Thus, just as in Aspect 26, complicated processing can be entrusted to the printer management server of high performance, so that the burden of the printer is lightened, and a time period required for the information processing can be greatly shortened.

BRIEF DESCRIPTION OF THE DRAWINGS

FIG. 1 is a block diagram showing one embodiment of a failure prediction notification system.

FIG. 2 is a diagram showing the hardware architecture of a printer management server.

FIG. 3 is a diagram showing the hardware architecture of a printer.

FIG. 4 is a flow chart showing the flow of the processing of the printer management server.

FIG. 5 is a flow chart showing the flow of the processing of each printer.

FIG. 6 is a diagram showing an example of log information acquired from individual printers.

FIG. 7 is a diagram showing an example of a printed matter in which failure prediction information is printed on a print sheet.

FIG. 8 is a diagram in which log information items acquired from two printers are saved in time series.

FIGS. 9a–g are diagrams in which the numerical values of individual parameters are defined.

FIG. 10 is an error list in which only the log information items having undergone errors are extracted from FIG. 8.

FIG. 11 is a diagram showing examples of the correlations between a failure and parameters.

FIG. 12 is a diagram showing the data example of a failure prediction notification which is sent from the server to the printers.

FIG. 13 is a diagram showing an example of a format which is employed for the printing of the failure prediction notification.

FIG. 14 is a diagram showing an example of information which is utilized for the conversion of the format in FIG. 13.

FIG. 15 is a graph showing a Weibull distribution curve.

FIG. 16 is a graph showing examples in which Weibull distributions have been compensated for.

DETAILED DESCRIPTION

Now, the best mode for carrying out the invention will be described in detail with reference to the accompanying drawings.

FIG. 1 is a block diagram showing one embodiment of a failure prediction notification system 100 according to the present invention.

As shown in the figure, the failure prediction notification system 100 is such that a plurality of printers P1, P2, . . . PN, and a printer management server S for managing the printers P1, P2, . . . PN are interconnected through a wired or radio network N such as a LAN or the Internet, in telecommunicable fashion.

The printer management server S is constructed including basic functions as a printer management server, for managing the constructions, print jobs, etc. of the individual printers P1, P2, . . . PN, and in addition, at least, service situation acquisition means 10, failure analysis means 12, failure prediction means 14 and failure prediction notification means 16. The individual means 10, 12, 14, 16 will be described below.

First, the service situation acquisition means 10 offers the function of periodically or occasionally acquiring and holding (saving) information regarding the service situations of the individual printers P1, P2, . . . PN, as log information bearing operation IDs.

Here, FIG. 6 shows a practicable example of the log information bearing the operation IDs. In the illustrated example, the log information bearing the operation IDs is broadly classified into "operation logs" and "print status logs". Besides, by way of example, a "print speed", a "print sheet (print medium)", a "print color", a "sheet size" and the "number of print copies" in each of the printers P1, P2, . . . PN are mentioned as the "operation log", while the "total number of print copies", a "printer model", the "serial No. of the printer", "ink reserves", a "status" and an "error code" are mentioned as the "print status log". Incidentally, other setting information in a printing mode may include the "type of a selected paper feed cassette", the "bins of paper ejection and the number of copies thereof", an "overlay (watermark)", a "method of rendering (halftone)", the "presence or absence of both-sided print", "enlargement/reduction print", "layout information", a "printing direction (forward/reverse)", "staple (finisher)", etc.

The engine information of the individual printers P1, P2, . . . PN can be included as the statuses of the respective printers P1, P2, . . . PN. Various indices which exist in "Printer MIB (Management Information Base)", "Job MIB", etc., are considered therefore. Mentioned as typical indices are the "user name of a job", the "state of the print queue of print characters", "on-line/off-line", "paper jamming", "sheet run-out", "toner (ink) run-out", "waste toner full", the "consumables run-out of the finisher", the "expiration of the life of a photosensitive unit", "door open", a "service request", "localize (language) information", the "name of an operator or a serviceman", a "model", a "type", etc.

The acquisition timing of the information regarding the service situations is not especially restricted as stated before, but any of a time previously set by users or a system administrator, the time of the end of each printing, the time of an information acquisition request made by the system, etc. is considered as the acquisition timing. Herein, a time period during which the status of the system changes after the end of print processing is favorable, and the most suitable is a time immediately after the end of the print processing.

In addition, the log information thus acquired is temporarily held in a main storage (RAM) on hardware and is also stored in a hard disk (HDD), a rewritable storage of large capacity such as semiconductor memory or optical disk device, or the like, not shown, and desired printer information can be accessed and retrieved at any time.

Next, the failure analysis means 12 offers the function of analyzing the relations between failures and the service situations (print settings) of the respective printers P1, P2, . . . PN as acquired by the service situation acquisition means 10.

By way of example, in the existence of any printer P whose frequency of occurrences of the "paper jamming (error)" is abnormally high, the service situation thereof is compared With that of another printer P whose frequency of occurrences of paper jamming is low, and a different service condition in the utilization situations of both the printers is found out as the result of the comparison. In a case where a conspicuously different part is the "print sheet", the "paper jamming" is recognized to correlate with the sort of the "print sheet".

In a case where a failure has occurred in the "paper feed mechanism" of a certain printer P, the service situation of the printer before the occurrence of the failure is analyzed, and information relevant to the "paper feed mechanism" is extracted. As the result of the extraction, the correlation between the frequency of occurrences of the "paper jamming" and the "paper feed mechanism" is recognized. From these results, it is possible to obtain the correlation between the service situation and the failure that, when the "print sheet" of the certain sort continues to be used, the failure of the "paper feed mechanism" may highly possibly be incurred.

Incidentally, for confirming the presence or absence of the relation more precisely, the "cross-correlation" is taken between a time period before the failure (MTBF: Mean Time Before Failure) and the print setting. The "cross-correlation" is so common as to be used for the analytical tool of Excel (registered trademark). The technique assumes a value from "−1" to "1", and a larger absolute value signifies a more intense correlation ("0": there is quite no relation between both indices, "1": a relation in which, when one index enlarges, also the other index enlarges, and "−1": a relation in which, when one index enlarges, the other index becomes small). Therefore, in a case where the "cross-correlation" is multiplied by the time period before the failure and a rate at which the users select the certain print setting (option) and where the resulting absolute value exceeds a predetermined value (for example, ±0.5), it can be judged that the failure and the print setting (option) selected by the user are relevant.

Herein, the "cross-correlation" can be easily calculated using Equation 1 given below.

In a case where, letting $x_i$ and $y_i$ ($1 \leq i \leq n$) denote two data sequences, and X and Y denote the averages of the respective data sequences, $Sxx = \Sigma(x_i - X)^2$, $Syy = \Sigma(y_i - Y)^2$, and $Sxy = \Sigma(x_i - X)(y_i - Y)$ are put, a cross-correlation function "Rxy" becomes the following Eq. 1:

$$\frac{\partial s}{\partial b} = -2x^T[y - Xb] = 0 \qquad \therefore b = [x^T x]^{-1} x^T y$$

where $y = [y_1 y_2 \ldots y_N]^T$ $b = [b_0 b_1 b_2 \ldots b_n]^T$ $$x = \begin{bmatrix} 1 & x_{11} & x_{12} & \ldots & x_{1n} \\ 1 & x_{21} & x_{22} & \ldots & x_{2n} \\ & & \ldots & & \\ 1 & x_{N1} & x_{N2} & \ldots & x_{Nn} \end{bmatrix}$$

Next, the failure prediction means 14 offers the function of predicting the occurrence time of a failure and the contents thereof every printer P from the correlation analyzed by the failure analysis means 12.

By way of example, in the case as stated above where the use of the certain sort of "print sheet" has been judged to correlate with the failure of the "paper feed mechanism", the failure occurrence time of another printer P and the contents of the failure (the failure of the "paper feed mechanism") can be predicted from the above analytical result upon the judgment that the other printer P including the same "paper feed mechanism" uses the same sort of "print sheet". Incidentally, the result of the prediction usually becomes more precise as the number of analytical data becomes large, and the predictability (prediction reliability) of the result should desirably be also judged as explained later.

As an example of a practicable prediction method in the failure prediction means 14, when the "cross-correlation" between the failure and the print setting (option) selected by the user has been revealed as stated before, the failure occurrence time is predicted by employing this "cross-correlation", and a "regression analysis method" considered to be a general index.

The "regression analysis method" is classified into a "linear regression analysis" in which another index is predicted from a certain index on the basis of past data, and a "multilinear regression analysis" in which an index is predicted from a plurality of indices. Herein, since the "multilinear regression analysis" comprehends the "linear regression analysis", the time period before the failure can be predicted somewhat precisely by employing only the "multilinear regression analysis".

Now, the "multilinear regression analysis" will be briefly described.

First, let's consider a method in which, when N sets of data ($y_i$, $x_{i1}$, $x_{i2}$, . . . $x_{in}$)i=1, 2, . . . , N have been given, the value of y is predicted on the basis of these data by the linear coupling of $x_1$, $x_2$, . . . $x_n$;

$y = b_0 + b_1 x_1 + b_2 x_2 + \ldots b_n x_n$.

A prediction based on a regression line (a prediction based on the least squares method) corresponds to the case of "n=1".

The multilinear regression analysis is the expansion of the above prediction for the case of "n>1". As in the case where the coefficient of the regression line has been determined, "b" which minimizes a minimum squared error;

$$s = [y - Xb]^T [y - Xb]$$

can be obtained by the following Eq. (2):

$$Rxy = \frac{Sxy}{\sqrt{Sxx - Syy}}$$

The value b̲ thus obtained is called "(the estimative value) of a partial regression coefficient".

More specifically, since $b_0, b_1, b_2, \ldots b_n$ are found by such a "multilinear regression analysis", the predicted time period "y" before the failure can be calculated as the above formula "$y = b_0 + b_1 x_1 + b_2 x_2 + b_n x_n$" in accordance with the linear coupling of the selection degrees $x_1, x_2, \ldots x_n$ of the respective print settings (options), and it becomes the limit (time period) before the failure.

Next, the failure prediction notification means 16 offers the function of notifying the occurrence time and contents of the failure of each printer P as predicted by the failure prediction means 14, to the individual printers P1, P2, . . . PN through the network N.

Here, the notification time of the predicted result is not especially restricted. However, in order to prevent any predicted result of low reliability from being vainly notified, the predicted result should desirably be notified upon judging that a certain degree of reliability has been obtained for the predicted result, for example, when a predictability predicted by the failure prediction means 16 has exceeded 80%.

Incidentally, the service situation acquisition means 10, failure analysis means 12, failure prediction means 14 and failure prediction notification means 16 of the printer management server S are actually incarnated by a computer system which is constructed of hardware comprising a CPU, a RAM, etc. as shown in FIG. 2, and dedicated computer programs (software) realizing algorithms as shown in FIG. 4, etc.

More specifically, the hardware for incarnating the printer management server S is such that, as shown in FIG. 2, a CPU (Central Processing Unit) 40 which is a central processing unit taking charge of various controls and arithmetic processing, a RAM (Random Access Memory) 41 which is employed as a main storage (Main Storage), a ROM (Read Only Memory) 42 which is a read-only storage, a secondary storage (Secondary Storage) 43 such as hard disk drive (HDD) or semiconductor memory, an output device 44 which includes a monitor (LCD (liquid crystal display) or CRT (cathode-ray tube)), or the like, an input device 45 which includes an image scanner, a keyboard, a mouse, an imaging sensor such as of CCD (Charge Coupled Device) or CMOS (Complementary Metal Oxide Semiconductor), or the like, and an input/output interface (I/F) 46 for a communication network N such as a LAN, a WAN or the Internet, are bus-connected by various internal and external buses 47 such as a processor bus, a memory bus, a system bus and input/output buses which include a PCI (Peripheral Component Interconnect) bus, an ISA (Industrial Standard Architecture) bus, or the like.

Programs for the various controls, and data which are supplied through a storage medium, for example, a CD-ROM, DVD-ROM or flexible disk (FD), or the communication network N are installed into the secondary storage 43 or the like, and the programs and data are loaded into the main storage 41. In accordance with the programs loaded into the main storage 41, the CPU 40 freely uses various resources to perform predetermined controls and arithmetic processing, to deliver the processed results (processed data) to the output device 44 through the bus 47 and display them, and to transmit the data (print data, failure prediction notification data, etc.) to the individual printers P1, P2, . . . , PN through the network N or occasionally perform the processing of storing or saving (updating) the data in the secondary storage 43 as may be needed.

On the other hand, each of the printers P1, P2, . . . , PN is constructed including basic functions as a printing device, such as a print mechanism, a paper feed mechanism and an operation panel, and in addition, failure prediction reception means 20 and failure prediction print means 22 as shown in FIG. 1.

The failure prediction reception means 20 offers the function of receiving the failure prediction notification data transmitted from the printer management server S, and it offers the function of subjecting the received failure prediction notification data to a rendering process, etc. and converting them into printable character information, and then delivering the character information to the failure prediction print means 22. Incidentally, the failure prediction reception means 20 occasionally functions as information transmission means for log information regarding a service situation for transmitting data on the service situation of the corresponding printer P in compliance with the request of the service situation acquisition means 10 of the printer management server S.

Also, the failure prediction reception means 20 and the failure prediction print means 22 of each of the printers P1, P2, . . . , PN are actually incarnated by a computer system which is constructed of hardware comprising a CPU, a RAM, etc. as shown in FIG. 3 and included in the existing printer P, and dedicated computer programs (software) realizing algorithms as shown in FIG. 5, etc. More specifically, the hardware for incarnating each of the printers P1, P2, . . . , PN is such that, as shown in FIG. 3, a CPU 40, a RAM 41, a ROM 42, a secondary storage 43, a print mechanism 49 which is an output device, an operation panel 48 which is an input device, and an input/output interface (I/F) 46 for the communication network N such as the LAN, WAN and Internet, are bus-connected by various internal and external buses 47 such as a processor bus, a memory bus, a system bus and input/output buses.

Programs for various controls, and data which are supplied through a storage medium, for example, a semiconductor ROM, DVD-ROM or flexible disk (FD), or the communication network N are installed into the secondary storage 43 or the like, and the programs and data are loaded into the RAM 41. In accordance with the programs loaded into the RAM 41, the CPU 40 freely uses various resources to perform predetermined controls and arithmetic processing, to output the processed results (processed data) as a printed matter from the print mechanism 49 through the bus 47, and to transmit the data of information regarding the service situation of the printer to the individual devices through the network N or occasionally perform the processing of storing or saving (updating) the data in the secondary storage 43 as may be needed.

A protocol for the communications between each of the printers P1, P2, . . . , PN and the printer management server S is not especially restricted. If the data are transmitted via the network N such as the Internet, the TCP/IP protocol which is standard in the Internet is utilized, and in the LAN which is unified by a certain specified vendor, a specified protocol such as AppleTalk/EtherTalk (registered trademark), NetBEUI/NetBIOS (registered trademark) or SPX/IPX (registered trademark) can be utilized. With, for example, the TCP/IP, there will be often used any of TCP (Transmission Control Protocol) for establishing a connection between each of the printers P1, P2, ..., PN and the printer management server S and ensuring reliable communications, UDP (User Datagram Protocol) which is a protocol of connectionless type for offering efficient communications, and IP (Internet Protocol) which is a protocol for sending packets to a predetermined destination from among a large number of paths, and also, Telnet (Telecommunication Network) which is a protocol for remote-controlling an opposite terminal through a network, FTP (File Transfer Protocol) which is a protocol for executing file transfer by utilizing the Telnet, NFS (Network File System) which is a protocol for offering a transparent file access function for another computer, SNMP (Simple Network Management Protocol) which is a protocol for exchanging network management information items such as failure information and traffic information, ARP and RARP (Address Resolution. Protocol, Reverse ARP), SLIP and PPP (Serial Line Protocol, Point to Point Protocol), RIP and OSPF (Routing Information Protocol, Open Shortest Path First), RSVP (Resource Reservation Protocol), IPsec (IP security Protocol), IGMP (Internet Group Management Protocol), NTP (Network Time Protocol), and so forth.

The printer management server S need not always exist independently on the network N, but, for example, the server S may exist in unification with any of the printers P1, P2, ..., PN, or that two or more such servers S exist independently.

Next, the flow of processing, and operations and advantages based on the failure prediction notification system 100 of the present invention as has such a construction will be described by referring chiefly to the flow charts of FIGS. 4 and 5. Incidentally, the flow chart of FIG. 4 shows the flow of processing on the side of the printer management server S, while the flow chart of FIG. 5 shows the flow of processing on the side of each of the printers P1, P2, ..., PN.

As shown in FIG. 4, first of all, the printer management server S (the service situation acquisition means 10 thereof) makes requests for acquiring information regarding utilization situations, for all the printers P1, P2, ..., PN to-be-monitored connected by the identical network N, at a first step S100, thereby to acquire log information regarding the service situations of the individual printers P1, P2, ..., PN. Incidentally, the log information regarding the service situation of the printer P may be thus acquired in compliance with the acquisition request from the side of the printer management server S, and it may well be notified, for example, actively from the side of the printer P to the side of the printer management server S each time a print process ends, or collectively after several times of print processes have ended.

The printer management server S having made the information acquisition requests in this way proceeds to the next step S102, at which it judges whether or not the log information complying with the acquisition request has been actually notified, as to each of the printers P1, P2 ..., PN being subjects for the acquisition requests. Upon judging that the log information has been notified, the printer management server S proceeds to the next step S104, at which it acquires such log information items and successively saves (accumulates) in the main storage RAM 41, the secondary storage 43 or the like.

Subsequently, the printer management server S proceeds to a step S106, at which it judges whether or not the accumulated quantity of the log information items thus acquired has reached a predetermined quantity. If the information quantity has reached the predetermined quantity (Yes), the printer management server S proceeds to the side of the next step 108, at which the correlation between any service situation and a failure is analyzed on the basis of the log information items obtained till then, by the failure analysis means 12. In a case, for example, where the failure has occurred in the "paper feed mechanism" of a certain printer P as stated before, the service situation correlating with the failure of the "paper feed mechanism" is analyzed.

Thereafter, the routine proceeds to a step S110, at which the occurrence time and contents of the failure are predicted on the basis of the result of the analysis by the failure prediction means 14, followed by the next step S112, at which the failure prediction notification means 16 performs the processing of judging the reliability of the resulting failure prediction information. Incidentally, although a technique for judging the reliability is not especially restricted, the reliability is judged on the basis of data on past failures or the number of the log information items. By way of example, even in the case where the log information quantity has exceeded the predetermined quantity, the reliability can be considered to become different depending upon whether the log information quantity corresponds to the smallest possible number of the predetermined quantity, or it is much larger than the predetermined quantity. In general, as the log information quantity for use in the analysis or the number of the data on the past failures is larger, the reliability of the predicted result can be judged higher.

When the judgment of the reliability of the failure prediction information has been executed in this way, the routine proceeds to the next step S114, at which the failure prediction notification means 16 similarly judges whether or not the reliability has reached a predetermined value ("threshold value"), for example, a prediction reliability of "80%".

In a case where, as a result, the prediction reliability has been judged to reach the "threshold value" (Yes), the failure prediction notification means 16 notifies the pertinent printers P of the failure prediction information as it is. In contrast, in a case where the prediction reliability has been judged not to reach the "threshold value" (No), the routine returns to the first step S100, and the same processing is iterated until the prediction reliability reaches the predetermined value.

Thus, only the failure prediction information of high reliability is notified to the pertinent printers P, so that the failure prediction information of low reliability is prevented from being vainly notified, and the confusion of the printer users can be avoided. By the way, in a case where the data on the past failures and the log information items have been sufficiently accumulated and where only the failure prediction means 14 is permitted to obtain failure prediction of high reliability, the reliability judgment processing steps indicated at the steps S112 and S114 may well be omitted.

Meanwhile, as shown in FIG. 5, after the closure of power supply at a first step S200, each of the printers 1, P2, ..., PN continues to be in a status (receivable status) waiting for data communication from the printer management server S.

When each of the printers 1, P2, ..., PN (the reception means thereof) has judged the reception of the notification from the printer management server S at the next judgment step S202 (Yes), it proceeds to the next step S204, at which it analyzes if the contents of the notification is information regarding the "failure prediction notification", information regarding the "request for acquiring the information regarding the service situation", or other information (such as information regarding a print request).

As the result of the analysis, first of all, whether or not the information sent from the failure prediction notification means 16 is the failure prediction notification is judged at the next step S206. When the information has been judged to be the failure prediction notification (Yes), the routine proceeds to the side of a step S212, at which the failure prediction print means 22 prints the contents of the failure prediction notification on a print sheet included in the printer itself and outputs it by utilizing the print function of the printer itself.

Herein, the contents of the printing of the failure prediction notification are not especially restricted, but it is desirable to print a message which concretely indicates the failure occurrence time and the contents of the failure, for example, "The paper feed mechanism might fail when the number of print copies has reached about 1000 more. Early repair or inspection of the paper feed mechanism is recommended." as shown in FIG. 7.

Thus, the user can concretely grasp the time and contents of the failure of his/her own printer, so that he/she is permitted to alter a print schedule or carry out necessary maintenance in accordance with the time and contents of the failure, and he/she can avoid the negative influence of the sudden failure on business.

The time and contents of the failure are notified to the user by utilizing the print function (print mechanism, print sheet, ink (toner), etc.) inevitably included in any of the printers 1, P2, . . . , PN. Therefore, it becomes unnecessary to separately prepare a display device such as LCD or to buy anew a printer furnished with a dedicated display device, and the purpose can be achieved economically.

Moreover, since the notification utilizes the print function, even a message of complicated contents or large information quantity or a message with a picture can be delivered to the printer users, and others easily and reliably.

Furthermore, in case of notifying the failure prediction by mail or like means, some of the recipients of the mail are not directly relevant to the printing, but the printing can directly convey the failure prediction to the users relevant to the printers.

By the way, in executing the printing for notifying the predicted time and contents of the failure, a method of use as can delay the failure after the predicted time may well be simultaneously printed if found out.

By way of example, when a message as in the above example; "When the paper feed mechanism is used as it is, it will highly possibly fail after about one month." is accompanied by a message to the effect that the user should refrain from the use of the sort of "print sheet" intensely correlating with the failure, for example, "Please use the standard sort of print sheet.", the user of the pertinent printer P is permitted to control the predicted failure time somewhat voluntarily by changing the sort of print sheet in compliance with the annexed message.

Also, a countermeasure may be simultaneously printed in the case where the actual failure has occurred, for example, a countermeasure which can be easily taken by the printer user himself/herself without requiring any especially high degree of knowledge or technique, such as turning OFF and ON the power supply of the printer or the operation of installing an ink (toner) cartridge, or information contents Which notify the location, telephone No., office hours, etc. of a nearby service center.

Further, before the concrete failure predicted is actually ameliorated (corrected), the page of the failure prediction notification may well be simultaneously printed each time the printing is performed. Likewise, before the concrete failure predicted is actually ameliorated, printing may well be so performed that a failure notification mark is given to the specified positions of the pages of all printed matters, for example, the central parts of the header portions of documents, or that watermarks are given to the whole documents. Thus, even in a case where the printer users, and others did not notice the message printing as stated above or where they overlooked the message printing carelessly, the failure prediction can be reliably notified to them.

In particular, such a method is thought to be effective especially in an aspect where each printer is shared by a plurality of users.

FIGS. 8–14 show practical examples of the step S202–step 206 shown in FIG. 5.

First, FIG. 8 shows a state where log information items on the service situations of two printers ("12345", "54321") have been acquired, and where they are successively arrayed by affording "operation IDs" to them.

The information items to be acquired are a "print speed" 101, a "print sheet" 102, a "print color" 103, a "sheet size" 104, the "number of print copies" 105, the "total number of print copies" 106, a "printer model" 107, the "serial No." 108, the "reserve of C (cyan)" 109, the "reserve of M (magenta)" 110, the "reserve of Y (yellow)" 111, the "reserve of K (black)" 112, a "status" 113, and an "error code" 114. Actual numerical values ("the numbers of copies" and "%") are entered into those parameters of the above information items which consist of the "number of print copies" 105, the "total number of print copies" 106, the "printer model" 107, the "serial No." 108, the "reserve of C (cyan)" 109, the "reserve of M (magenta)" 110, the "reserve of Y (yellow)" 111, and the "reserve of K (black)" 112, whereas either of the two numerical values "0" and "1" as concretely stipulated in FIGS. 9(*a*)–(*e*) is stated in each of the "print speed" 101, the "print sheet" 102, the "print color" 103, the "sheet size" 104, and the "status" 113.

Besides, regarding the "error code" 114, in a case where any error does not occur" no statement is contained, and in a case where any error has occurred, either of two numerical values ("11111", 22222") indicating the sorts of errors as shown in (f) or (g) of FIG. 9 is entered.

Accordingly, as shown in FIG. 8, the practical information items on the service situation as stipulated by, for example, the operation ID "00001" indicate that 100 copies were printed by the printer of the printer model "XXX" and the serial No. "12345". Print settings (print conditions) on that occasion were the print speed of "1: fast", the print sheet of "0: plain paper", the print color of "0: multi-color", the sheet size of "0: A4", the total number of print copies of "100", the status of "0: normal", and the error of "none".

The practical information items on the service situation as stipulated by the operation ID "00003" indicate that 1500 copies were printed by the printer of the printer model "XXX" and the serial No. "54321". Print settings (print conditions) on that occasion were the print speed of "0: fair", the print sheet of "0: plain paper", the print color of "0: multi-color", the sheet size of "0: A4", the total number of print copies of "1500", the status of "0: normal", and the error of "none".

Further, the practical information items on the service situation as stipulated by the operation ID "00014" indicate that 400 copies were printed by the printer of the printer model "XXX" and the serial No. "12345". Print settings (print conditions) on that occasion were the print speed of "1: fair", the print sheet of "0: plain paper", the print color of "0: multi-color", the sheet size of "0: A4", the total number of print copies of "1390", the status of "1: failed", and the error of "11111".

That is, it is indicated that the print processes stipulated by the operation IDs "00001" and "00003" proceeded normally, whereas a failure (hereinbelow, termed "error A") occurred in the paper feed mechanism in performing the print process stipulated by the operation ID "00014".

It is indicated that failures (hereinbelow, termed "error B" and "error C") similarly occurred in the paper feed mechanisms in the print processes stipulated by the respective operation IDs "00024" and "00026", and that, in any of the operation IDs except the three processes, the print process was normally executed without undergoing any error.

Next, FIG. 10 is an error list showing the error interval (number of copies) 117 of the error "11111" in the case where each of the three errors A, B and C indicated in FIG. 8 occurred, the "print settings" 115 on that occasion, and the "mean utilization values" 116 of the "print settings" 115 before the occurrence of the error "11111".

More specifically, the "error A" in the operation ID "00014" occurs at "1390 copies" since the start of the first printing. Regarding the mean utilization values 116 of the "print settings" 115 on that occasion; the value of the "print speed" becomes "1.000 (((operation ID: 00001="1")+(operation ID: 00002="1")+(operation ID: 00005="1")+(operation ID: 00006="1")+(operation ID: 00008="1")+(operation ID: 00010="1")+(operation ID: 00011="1")+(operation ID: 000013="1")+(operation ID: 00014="1")/9)", and the value of the "print sheet" becomes "0.000 (("0"+"0"+"0"+"0"+"0"+"0"+"0"+"0"+"0")/9)" because all the operation IDs have the same settings. Besides, the mean utilization value of the "print color" becomes "0.222 (("0"+"0"+"1"+"1"+"0"+"0"+"0"+"0"+"0")/9)", and the value of the "sheet size" becomes "0.000" because all the operation IDs have the same settings as in the case of the "print sheet".

Meanwhile, the "error B" in the operation ID "00026" occurs at the "800th copy (2190–1390)" as reckoned from the "error A". Regarding the mean utilization values 116 of the "print settings" 115 on that occasion, the value of the "print speed" becomes "1.000 (((operation ID: 00015="1")+(operation ID: 00018="1")+(operation ID: 00022="1")+(operation ID: 00025="1")+(operation ID: 00026="1"))/5)", and the value of the "print sheet" becomes "0.000 (("0"+"0"+"0"+"0"+"0"/5)" because all the operation IDs have the same settings. Besides, the mean utilization value of the "print color" becomes "0.800 (("1"+"1"+"1"+"1"+"0")/5)", and the value of the "sheet size" becomes "0.000" because all the operation IDs have the same settings as in the case of the "print sheet".

Further, the "error C" in the operation ID "00024" occurs at "6800 copies" since the start of the first printing. Regarding the mean utilization values 116 of the "print settings" 115 on that occasion, the value of the "print speed" becomes "0.082 (((operation ID: 00003="0")+(operation ID: 00004="0")+(operation ID: 00007="0")+(operation ID: 00009="0")+(operation ID: 00012="0")+(operation ID: 00016="0")+(operation ID: 00017="0")+(operation ID: 00019="0")+(operation ID: 00020="0"+(operation ID: 00021="0"+(operation ID: 00023="0"+(operation ID: 00024 ="1"))/12)", and the value of the "print sheet" becomes "0.000 (("0"+"0"+"0"+"0"+"0"+"0"+"0"+"0"+"0"+"0"+"0"+"0")/12)" because all the operation IDs have the same settings. Besides, the mean utilization value of the "print color" becomes "0.167 (("0"+"0"+"0"+"0"+ "0"+ "0"+"1"+"0"+"1"+"0"+"0"+"0")/12)", and the value of the "sheet size" becomes "0.000" because all the operation IDs have the same settings as in the case of the "print sheet".

As a result, it is understood that the utilization rate of the multi-color printing ("0") is high as to the "error A" and "error C", whereas the utilization rate of the monochromatic printing ("1") is high as to the "error B". It is also understood that the "fast ("1")" is selected as the "print speed" in all the operation IDs as to the "error A" and "error B", whereas the rate of selecting the "fair ("0")" as the "print speed" is high as to the "error C".

The relations between the individual print settings ("print speed", "print color", "print sheet", and "sheet size") and the error "11111" were computed using the respective mean utilization values 116 thus obtained, and the equation of the cross-correlation mentioned before. As a result, it has been revealed that, as indicated in FIG. 11, the cross-correlations between the error "11111" of the paper feed mechanism and the "print speed" and "print color" become "−0.996" and "−0.63824", respectively, so the error and the print settings intensely correlate with each other (the cross-correlation becomes the maximum at the absolute value "1"). By the way, in the example of FIG. 8, all the operation IDs had the same conditions as to the "print sheet" and "sheet size", and hence, the correlations between these settings and the error were immeasurable.

The failure prediction time period (number of copies) of each of the printers P1, P2, . . . , PN can be calculated by employing the cross-correlations thus calculated and the multilinear regression analysis explained before, as follows:

−5839.93×(utilization rate of print speed)−1021.15×(utilization rate of print color)+7456.852 (copies)

Herein, in the case of the printer "12345" mentioned in FIG. 8, the anticipated number of copies before the failure becomes "7556.852"−"5839.93"−"1021.15"−"200"=395.772 (copies).

Incidentally, FIG. 12 shows an example of the data on the failure prediction notification which is sent from the printer management server S to the pertinent ones of the printers P1, P2, . . . , PN. The contents of the notification are the time period before the occurrence of the failure (number of print copies: "395.772" copies"), the prediction failure code ("11111") indicating a portion where the failure will occur, and an annexed message. Besides, FIG. 13 shows an example of a format corresponding to each of predictive failures, while FIG. 14 shows an example of in-printer information which is utilized for the conversion of the format.

In general, a Weibull analysis principally constituted by a Weibull distribution as shown in FIG. 15 is often employed for classifying the patterns of the failures of equipments and analyzing the life characteristics of the equipments.

A Weibull distribution curve can be obtained in accordance with the following Eq. (3):

$$f(x) = \frac{m}{\alpha}(x-\gamma)^{m-1} e - \frac{(x-\gamma)^m}{\alpha}$$

where m: shape parameter

α: scale parameter

γ: position parameter

Herein, the Weibull distribution is neutral for a case where an environment in which the equipment or component to fail is located is not considered. Therefore, in a case where a certain printer P continues to be utilized with its print settings fixed, the Weibull distribution is applicable as it is. In actuality, however, the print settings of the printer P fluctuate every print supply, and hence, the Weibull distribution needs to be somewhat compensated for.

By way of example, a general printer P has the tendency that, when a print speed is set to be "fair", a paper feed mechanism is difficult of failing, and that, when the print speed is set to be "fast", the mechanism is difficult of failing. In the existence of such a tendency, it can be considered that, when the setting "fair" is often used as the print speed setting, the time y of the occurrence of the failure will enlarge as shown in FIG. 16.

In such a case, it can be considered that, if many users often use the setting "fast" as the print speed setting, a correct failure distribution will become a failure distribution which is nearer to a "fast" curve as shown in FIG. 16.

Now, referring back to the flow of FIG. 5, it has been judged at the step S206 that the contents of the notification are not of the failure prediction notification (No), the routine proceeds to the next step S208, at which the printer P judges whether or not the contents of the notification are information regarding the request for acquiring the information (log information) on the service situation of the pertinent printer P. When the printer P has judged that the contents of the notification are not such information (No), it ends processing (or enters an ordinary print process flow, assuming a request for printing). In contrast, when the printer P has judged that the contents of the notification are such information (Yes), it transmits the information (log information) on its service situation, to the printer management server S in compliance with the request, and it ends the processing.

In this way, detailed information regarding a service situation for each of the detailed printers P1, P2, . . . , PN is acquired and saved (accumulated) as indicated in FIG. 8.

Incidentally, although this embodiment has been described by exemplifying the failure prediction system 100 which is configured of the printer management server S and the printers P, the present invention is also assuming a request for printing). In contrast, when the printer P has judged that the contents of the notification are such information (Yes), it transmits the information (log information) on its service situation, to the printer management server S in compliance with the request, and it ends the processing.

In this way, detailed information regarding a service situation for each of the detailed printers P1, P2, . . . , PN is acquired and saved (accumulated) as indicated in FIG. 8.

Incidentally, although this embodiment has been described by exemplifying the failure prediction system 100 which is configured of the printer management server S and the printers P, the present invention is also applicable to equipments other than the printers P as have print functions, for example, copying machines and facsimiles.

What is claimed is:

1. A failure prediction notification system comprising:
    a printer; and
    a printer management server connected to the printer in telecommunicable fashion,
    wherein said printer includes:
        failure prediction reception means for receiving failure prediction information regarding a failure time and failure contents as notified from said printer management server; and
        failure prediction print means for printing the failure prediction information received by said failure prediction reception means on a print medium and outputting the printed information by employing a print function of said printer,
    wherein said printer management server includes:
        service situation acquisition means for acquiring information regarding a service situation of said printer;
        failure analysis means for analyzing a relation between the information regarding the service situation as acquired by said service situation acquisition means and a failure of said printer;
        failure prediction means for predicting an occurrence time of the failure of said printer and contents of the failure from the relation analyzed by said failure analysis means; and
        failure prediction notification means for notifying said printer of the occurrence time of the failure of said printer and the contents of the failure as predicted by said failure prediction means, and
    wherein:
        said failure prediction notification means notifies the predictive information predicted by said failure prediction means after a reliability of the predictive information has reached a predetermined value.

2. A failure prediction notification system as defined in claim 1, wherein:
    said failure prediction notification means simultaneously notifies a method of avoiding the failure.

3. A printer management server comprising:
    service situation acquisition means for acquiring information regarding a service situation of a printer;
    failure analysis means for analyzing a relation between the information regarding the service situation as acquired by said service situation acquisition means and a failure of said printer;
    failure prediction means for predicting an occurrence time of the failure of said printer and contents of the failure from the relation analyzed by said failure analysis means; and
    failure prediction notification means for notifying said printer of information regarding the occurrence time of the failure of said printer and the contents of the failure as predicted by said failure prediction means,
    wherein:
        said failure prediction notification means notifies the predictive information predicted by said failure prediction means after a reliability of the predictive information has reached a predetermined value.

4. The printer management server as defined in claim 3, wherein: said failure prediction notification means simultaneously notifies a method of avoiding the failure.

5. A failure prediction notification system comprising:
    a printer; and
    a printer management server connected to said printer,
    wherein said printer receives failure prediction information including a failure time and failure contents from said printer management server, and
    wherein said printer management server acquires service situation information from said printer, analyzes a relation between said service situation information and printer failure information, generates said failure prediction information based on said relation, calculates a reliability of said failure prediction information, and sends said failure prediction information to said printer when said reliability is greater than a predetermined value.

6. The failure prediction notification system of claim 5 wherein said printer management server sends a method of avoiding printer failure to said printer.

7. A failure prediction notification method comprising:
    acquiring service situation information from a printer;

analyzing a relation between said service situation information and printer failure information;

generating failure prediction information based on said relation, said failure prediction information including a failure time and failure contents;

calculating a reliability of said failure prediction information; and notifying said printer of said failure prediction information when said reliability is greater than a predetermined value.

8. The failure prediction notification method of claim 7 wherein said notifying includes notifying said printer of a method of avoiding printer failure.

9. A failure prediction notification system comprising:

a printer; and a printer management server connected to said printer, wherein said printer receives failure prediction information and a method of avoiding printer failure from said printer management server, and wherein said printer management server acquires service situation information from said printer, generates at least one correlation value between said service situation information and printer failure information, generates said failure prediction information based on said at least one correlation value, and recommends said method of avoiding printer failure based on said at least one correlation value.

10. The failure prediction notification system of claim 9 wherein said at least one correlation value correlates a printer setting with one of increased printer failure, decreased printer failure, and no effect on printer failure.

11. The failure prediction notification system of claim 10 wherein an absolute value of said at least one correlation value indicates a reliability of said correlation value.

* * * * *